US011758010B1

(12) United States Patent
Tamilselvam et al.

(10) Patent No.: US 11,758,010 B1
(45) Date of Patent: Sep. 12, 2023

(54) TRANSFORMING AN APPLICATION INTO A MICROSERVICE ARCHITECTURE

(71) Applicant: International Business Machines Corporation, Armonk, NY (US)

(72) Inventors: Srikanth Govindaraj Tamilselvam, TamilNadu (IN); Dinesh Garg, Beawar (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/944,541

(22) Filed: Sep. 14, 2022

(51) Int. Cl.
*H04L 67/51* (2022.01)
*G06N 20/00* (2019.01)
*G06F 40/20* (2020.01)
*G06F 40/30* (2020.01)

(52) U.S. Cl.
CPC .............. *H04L 67/51* (2022.05); *G06F 40/20* (2020.01); *G06F 40/30* (2020.01); *G06N 20/00* (2019.01)

(58) Field of Classification Search
CPC ......... H04L 67/51; G06F 40/20; G06F 40/30; G06N 20/00
See application file for complete search history.

(56) References Cited

U.S. PATENT DOCUMENTS

| 7,051,098 | B2* | 5/2006 | Masters | H04L 43/0811 709/224 |
| 11,144,289 | B1* | 10/2021 | Hwang | G06F 8/72 |
| 2016/0124742 | A1* | 5/2016 | Rangasamy | G06F 8/70 717/103 |
| 2018/0365008 | A1 | 12/2018 | Chandramouli et al. | |
| 2020/0118544 | A1* | 4/2020 | Lee | G10L 15/063 |
| 2020/0259715 | A1* | 8/2020 | Schermann | H04L 67/51 |
| 2020/0403868 | A1* | 12/2020 | Punathil | H04L 41/0823 |
| 2021/0029001 | A1 | 1/2021 | Sen et al. | |

(Continued)

OTHER PUBLICATIONS

Alex Mathai, et al., "Monolith to Microservices: Representing Application Software through Heterogeneous Graph Neural Network", https://arxiv.org/abs/2112.01317?context=cs, Dec. 1, 2021, 15 pages.

(Continued)

*Primary Examiner* — El Hadji M Sall
(74) *Attorney, Agent, or Firm* — Edell, Shapiro & Finnan, LLC

(57) ABSTRACT

According to one embodiment of the present invention, a system transforms an application for a distributed computing environment. The system comprises one or more memories, and at least one processor coupled to the one or more memories. The system analyzes a description of user intent to extract information for transforming the application. The extracted information indicates functionalities for the distributed computing environment. A plurality of software artifacts of the application are mapped to the functionalities. The plurality of software artifacts form different groups of software artifacts. Remaining software artifacts of the application are assigned into the different groups based on a remaining software artifact corresponding to a mapped software artifact of a group. The different groups correspond to microservices for the distributed computing environment. The microservices for the distributed computing environment are presented based on the different groups.

20 Claims, 7 Drawing Sheets

(56) References Cited

U.S. PATENT DOCUMENTS

| | | | | |
|---|---|---|---|---|
| 2021/0058424 | A1* | 2/2021 | Chang | G06N 3/044 |
| 2021/0136095 | A1* | 5/2021 | Dinh | G06N 5/01 |
| 2021/0232390 | A1 | 7/2021 | Hwang et al. | |
| 2021/0263735 | A1 | 8/2021 | Harishankar et al. | |
| 2021/0360083 | A1* | 11/2021 | Duggal | H04L 67/34 |
| 2022/0103618 | A1* | 3/2022 | Pinheiro | H04L 67/60 |
| 2022/0300357 | A1* | 9/2022 | Pal | G06N 5/02 |
| 2022/0357936 | A1* | 11/2022 | Duggal | G06F 8/60 |
| 2022/0398526 | A1* | 12/2022 | Krishnamoorthy | G06Q 10/063116 |

OTHER PUBLICATIONS

Jonas Fritzsch, et al., "From Monolith to Microservices: A Classification of Refactoring Approaches", https://arxiv.org/pdf/1807.10059.pdf, Mar. 2018, 13 pages.

Website, "IBM Mono2Micro", https://www.ibm.com/cloud/mono2micro, downloaded from the internet on Sep. 14, 2022, 7 pages.

Jin Xiao, et al., Article, "A non-disruptive approach to transform Java monliths to microservices", https://developer.ibm.com/articles/a-non-disruptive-approach-to-transform-java-monoliths-to-microservices/, Mar. 16, 2021, 16 pages.

* cited by examiner

US 11,758,010 B1

TRANSFORMING AN APPLICATION INTO A MICROSERVICE ARCHITECTURE

BACKGROUND

1. Technical Field

Present invention embodiments relate to cloud or other distributed computing, and more specifically, to transforming an application into a microservice architecture for a cloud or other distributed computing environment based on user intent obtained from natural language processing.

2. Discussion of the Related Art

Customers are increasingly performing application modernization in order to ease management of resources (e.g., infrastructure, human resources, etc.), scale applications, reduce cost, and enrich experience of clients. This is even more compelling during a transition to a cloud computing environment (or microservices) since this transition invariably forces customers to significantly change their applications to be cloud enabled.

However, current approaches providing microservice recommendations for application modernization are predominantly bottom-up driven. In other words, boundaries for functionality recommended for microservices are detected from the implementation structure of the application code without any external reference (i.e., recommendations are inferred from current code, tables, user interface screens, interfaces, data access objects (DAO), service entry points (SEP), etc.). In some cases, green field development is preferred (i.e., write or produce code from scratch) to avoid influence from an existing implementation structure. In other cases, re-use of relevant code is preferred for the modernization or standardization.

Although domain driven design (DDD) concepts are business driven, these concepts cannot be easily overlayed on monolith code (e.g., a single-tiered or non-distributed software application combining code for a user interface and data access, and typically a large single deployable application) to perform the modernization. This is due to the domain driven design (DDD) concepts being mostly applicable for a portfolio of applications that are intended to be partitioned based on modules and corresponding teams capable of supporting those modules.

SUMMARY

According to one embodiment of the present invention, a system transforms an application for a distributed computing environment. The system comprises one or more memories, and at least one processor coupled to the one or more memories. The system analyzes a description of user intent to extract information for transforming the application. The extracted information indicates functionalities for the distributed computing environment. A plurality of software artifacts of the application are mapped to the functionalities. The plurality of software artifacts form different groups of software artifacts. Remaining software artifacts of the application are assigned into the different groups based on a remaining software artifact corresponding to a mapped software artifact of a group. The different groups correspond to microservices for the distributed computing environment. The microservices for the distributed computing environment are presented based on the different groups. Embodiments of the present invention further include a method and computer program product for transforming an application for a distributed computing environment in substantially the same manner described above.

BRIEF DESCRIPTION OF THE DRAWINGS

Generally, like reference numerals in the various figures are utilized to designate like components.

DETAILED DESCRIPTION

Figure 1:
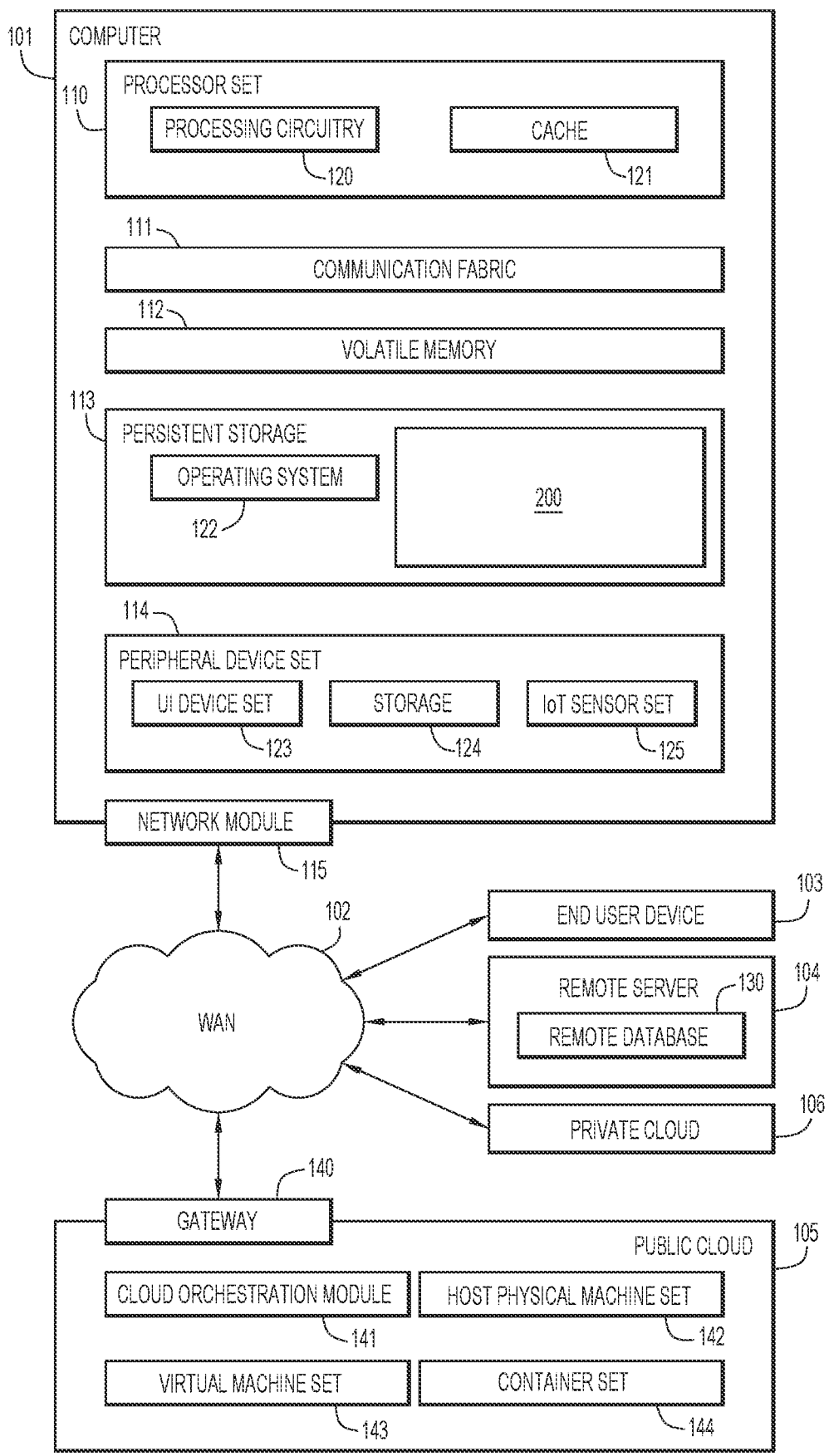
FIG. 1 is a diagrammatic illustration of an example computing environment according to an embodiment of the present invention.

An embodiment of the present invention enables users to specify an intent for application modernization (e.g., keywords, natural language text, project description, reference model, etc.) that drives extraction or recommendation of microservices for a monolith application or code (e.g., a single-tiered or non-distributed software application combining code for a user interface and data access, and typically a large single deployable application). However, any application may be transformed to a microservice or other distributed computing architecture. The present invention embodiment accepts user intent in the form of a natural language description, keywords, project description, or a reference model, and maps the user intent to software artifacts of the monolith application. The software artifacts may include any item pertaining to software or code of the application (e.g., modules or programs of source and/or compiled code, documentation, data structures, data, test cases, transactions, endpoints, service entry points (SEP), etc.). Mapped modules preferably serve as seeds for clustering the application functionality (or other code modules) into microservices (e.g., a collection of distributed services each developed as part of a group of services that provide an overall process).

An embodiment of the present invention enables a user (e.g., subject matter expert (SME), etc.) to specify a modernization target state for a monolith or other application using keywords, natural language text, a project description, or a reference model to indicate a user intent. Relationships are automatically established between the user intent and software artifacts of the monolith application (e.g., modules or programs of source and/or compiled code, documentation, data structures, data, test cases, transactions, endpoints, service entry points (SEP), etc.). Functionalities that cannot be mapped to the user intent are discovered, and may be dropped (or excluded) from modernization as deadcode or may be acknowledged by the user and included for the modernization. Software artifacts that align with the user intent are prompted for each microservice, and microservices that adhere to the user intent are generated to transform the monolith application to a microservice (or distributed) based architecture.

Current approaches providing microservice recommendations for application modernization are predominantly bottom-up driven. In other words, boundaries for functionality recommended for microservices are detected from the implementation structure of the application code without any external reference (i.e., recommendations are inferred from current code, tables, user interface screens, interfaces, data access objects (DAO), service entry points (SEP), etc.).

However, these approaches suffer from several disadvantages. For example, lack of standardization can lead to difficulty in management and adherence to new standards introduced in a domain. The lack of standardization may be caused by several factors. By way of example, some endpoints (e.g., pertaining to display or a temporary scenario) exposed in monolith applications may not be necessary in a target service model, and granularity of functionality in the monolith endpoints may be misleading (e.g., an endpoint in the monolith application may perform the functionality of several end points in a user defined model). Further, member fields of methods in the monolith application may be misleading in terms of number and naming. Moreover, since transactions in a monolith application may all be completed in a lesser number of method functions, determining ownership may become difficult. In addition, since microservice recommendations need to make sense and provide a comfort level for an end user to assign teams for producing or maintaining the recommended microservices, the end user should be involved from the beginning of the transformation or decomposition task.

Accordingly, an embodiment of the present invention considers user intent to map to key modules of a monolith or other application, and prompts for further modules to detect a scope of refactoring or transformation in order to recommend microservices. The present invention embodiment combines keyword expansion, data structure comparison, comments, static code analysis-based program analysis features (e.g., transactions, etc.) to compare definitions of the monolith programs. The present invention embodiment maps the user intent to software artifacts (e.g., modules or programs) of the monolith application, abstracts software artifacts of the monolith application to detect common functionality, and prompts and confirms a scope of clustering (or recommended microservices).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code involved in performing the inventive methods, such as transformation code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
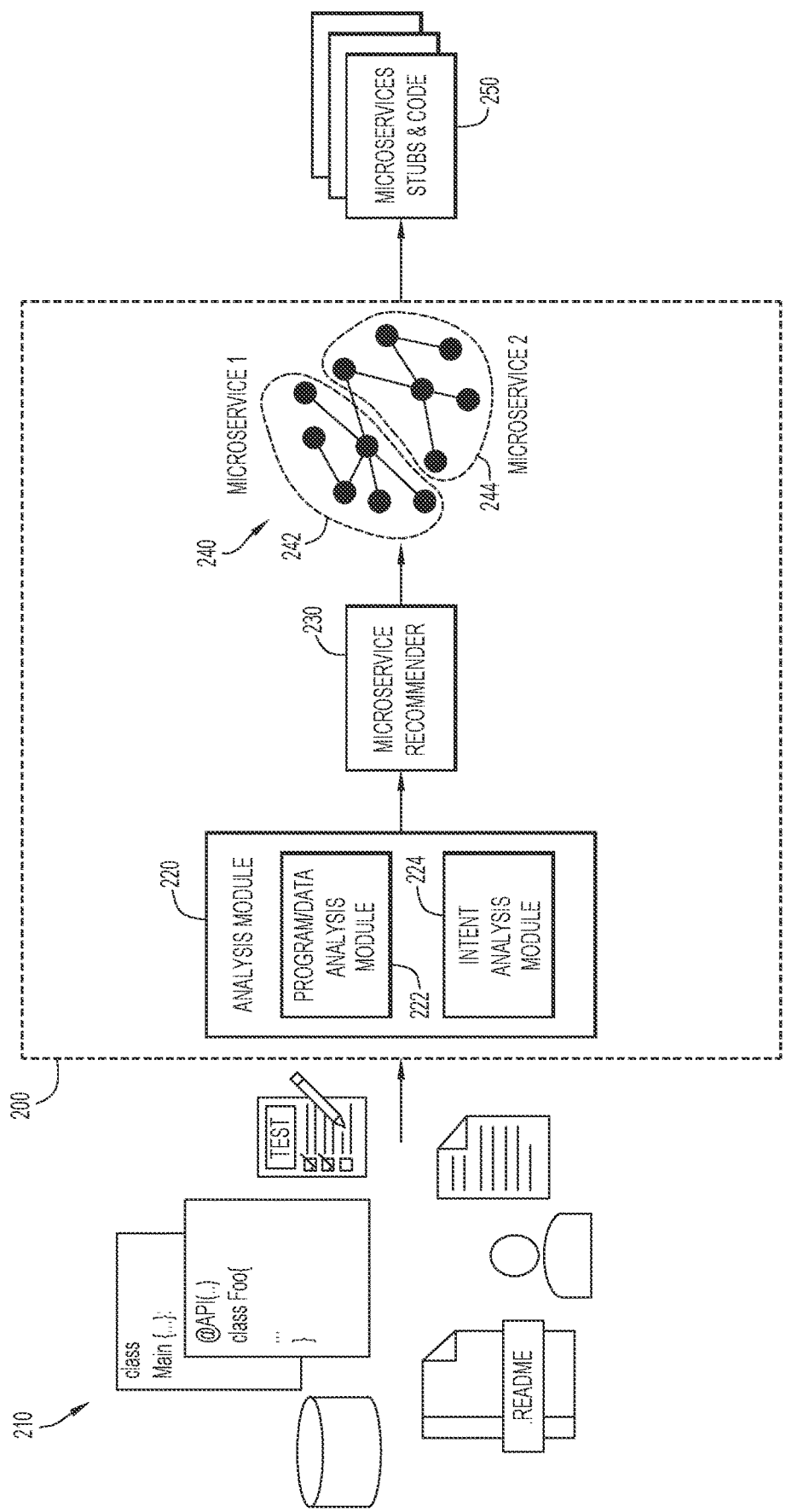
FIG. 2 is a flow diagram of transforming an application to a microservice architecture based on user intent according to an embodiment of the present invention.

A flow diagram for transforming an application to a microservice architecture based on user intent according to an embodiment of the present invention is illustrated in FIG. 2. Initially, various inputs 210 may be provided to transformation code 200 to produce microservices for an application. By way of example, the inputs may include code of an application to be transformed, various documents (e.g., readme or instruction documents, test documents, etc.), and/or a description of user intent for the transformation. The description is preferably in a natural language, and may include any form to provide a user intent or guidance for performing the transformation (e.g., keywords, text, a project description, a reference model, business or other language, readme or application description documents, etc.). The user intent or guidance may include any desired parameters or characteristics for producing the resulting microservices (e.g., functionality, specific software artifacts, quantity of resulting microservices and/or software artifacts for analysis, parameters, etc.). In other words, the user intent indicates a manner the user desires for partitioning or mapping the application to microservices (e.g., specific quantity of microservices to produce, certain modules to consider or exclude, functionalities desired, etc.).

Transformation code 200 includes an analysis module 220 and a microservice recommender 230. Analysis module 220 includes program/data analysis module 222 and intent analysis module 224. The program/data analysis module analyzes the code of the application to be transformed to provide various information (e.g., exposed services, service entry points (SEP), packages, names, comments, variables, database references in data definition language (DDL) or application code, plain old Java objects (POJO), interfaces, tables, labels, columns, module or program names, method names, summary, etc.) The intent analysis module employs natural language processing (NLP) and/or natural language understanding (NLU) techniques to determine functionality for microservices based on the description of the user intent. The intent analysis module identifies one or more modules of the application to use as seed modules for clustering by microservice recommender 230. However, any software artifacts of the application may be utilized. The seed modules basically indicate a center of a corresponding cluster for the clustering. The intent analysis module may interact with a user to confirm mapping of software artifacts to user intent and/or finalize functionalities or software artifacts to be considered for the transformation.

Microservice recommender 230 uses the seed modules as a center for corresponding clusters, and produces clusters with members (or application modules) having functionality similar or close to the seed module. In other words, the clusters each correspond to a microservice whose functionality is indicated by the members (or modules) belonging to that cluster. When an application module or program is assigned to two or more clusters, various metrics may be used to determine cluster membership (e.g., highest probability or confidence, etc.). By way of example, microservice recommender 230 may produce clusters 240 including a cluster 242 (e.g., corresponding to a microservice 1 as viewed in FIG. 2) and a cluster 244 (e.g., corresponding to a microservice 2 as viewed in FIG. 2). The functionality of members of the clusters indicate the functionality for the corresponding microservice. The microservice recommender may interact with a user to validate microservice recommendations, and/or provide for iterative design by enabling the user to move or re-arrange entities (e.g., microservices, functionalities, members within clusters, etc.).

Transformation code 200 may generate code stubs 250 (e.g., a code template or skeleton) for the microservices to expedite generation of the code. Alternatively, the transformation code may automatically generate the code for the microservices based on functionality or code of the modules belonging to the cluster. The generated microservices may be deployed to a cloud or other distributed computing environment and executed. The microservices represent a transformed version of the application suitable for the cloud or other distributed computing environment. Accordingly, present invention embodiments advance user involvement in the transformation or refactoring process.

The present invention embodiment reduces iteration for design finalization, and may generate a microservice project summary and a functional label for each microservice. In addition, inactive code and services of the application may be excluded from refactoring or transformation, and test cases may be generated and prioritized.

Figure 3:
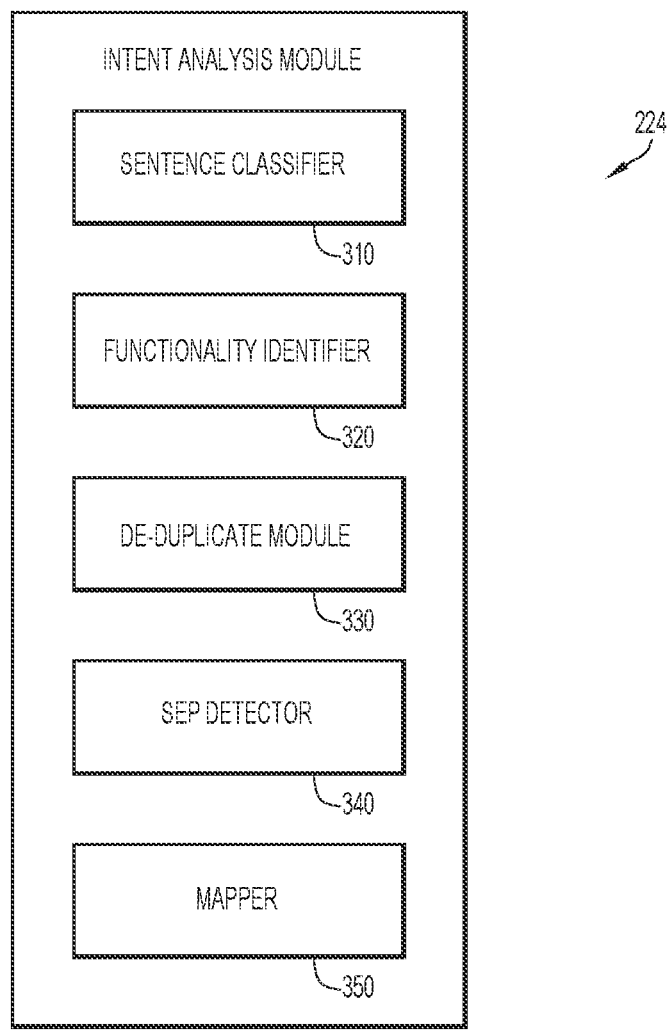
FIG. 3 is a block diagram of an intent analysis module according to an embodiment of the present invention.

FIG. 3 is a block diagram of intent analysis module 224 according to an embodiment of the present invention. The intent analysis module employs natural language processing (NLP) and/or natural language understanding (NLU) techniques to determine functionality for microservices based on a description of the user intent. The intent analysis module identifies one or more modules of an application to be transformed for use as seed modules for clustering by microservice recommender 230. However, any software artifacts of the application may be used as seeds for the clustering. The seed modules basically indicate a center or reference point for a corresponding cluster.

Intent analysis module 224 includes a sentence classifier 310, a functionality identifier 320, a de-duplicate module 330, a service entry point (SEP) detector 340, and a mapper 350. Sentence classifier 310 analyzes the description of user intent to determine sentences indicating a functionality and/or other information for the transformation (e.g., quantity of microservices, specified modules or services, etc.). The analysis may employ various conventional or other natural language processing (NLP) and/or natural language understanding (NLU) techniques. These techniques may include various functions, such as entity extraction (e.g., identification of entities), relationship extraction (e.g., identification of relationships between entities, such as parent child, contains, is a, etc.), semantic analysis (e.g., meaning of terms, etc.), and/or part-of-speech (POS) tagging or identification. The techniques may annotate data with various information (e.g., part-of-speech (POS), relationships, meaning, etc.) for processing.

Sentence classifier 310 may be a rules based classifier, where rules indicate certain text and corresponding classifications. For example, the rules may specify certain keywords and corresponding synonym expansions (e.g., application/app/system, supports/provides/exposes, functionality/module/features, etc.) that indicate the presence of functionality and/or other information within a sentence (e.g., quantity of microservices, specified modules or services, etc.). Further, the sentence classifier may identify hierarchical relations within a sentence based on the rules and/or NLP/NLU techniques (e.g., the rules may indicate relationships between the keyword, etc.).

Sentence classifier 310 may alternatively employ a machine learning model to perform the classification. The sentence classifier may further receive (or download) code and corresponding documentation (e.g., readme documents, etc.), and annotate the code and documentation (e.g., via the NLP/NLU techniques) to generate a learning corpus (or training data) for the machine learning model. Any conventional or other machine learning models may be employed (e.g., mathematical/statistical, classifiers, feed-forward, recurrent or other neural networks, etc.). For example, neural networks may include an input layer, one or more intermediate layers (e.g., including any hidden layers), and an output layer. Each layer includes one or more neurons, where the input layer neurons receive input (e.g., sentences, feature vectors, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the neural network may be trained with sentences (or feature vectors of sentences) as input and corresponding classifications (e.g., presence or absence of functionality) as outputs. The feature vectors may include any features or characteristics of the sentences (e.g., word count, character count, frequency of terms, etc.), where the neural network attempts to produce the provided output (or classification) and uses an error from the output (e.g., difference between produced and known outputs) to adjust weight (and bias) values (e.g., via backpropagation or other training techniques). The output layer of the neural network indicates a classification for the input data. By way of example, the output layer neurons may indicate a specific classification (e.g., corresponding to a presence or absence of functionality and/or other information). Further, output layer neurons may be associated with different classes and indicate a probability for the input data belonging to a class. The class associated with the highest probability is preferably selected as the classification (e.g., presence or absence of functionality and/or other information) for the input. The description of user intent may be parsed into sentences that are provided to the machine learning model. The machine learning model may receive the sentence text or feature vector, and produce a classification indicating the presence or absence of functionality and/or other information (e.g., quantity of microservices, specified modules or services, etc.) for a corresponding sentence.

Functionality identifier 320 identifies the functionalities indicated in the description of the user intent by analyzing the sentences classified by sentence classifier 310 as containing a functionality. The functionality identifier may be rules based, where rules indicate certain text or text patterns and corresponding classifications. For example, the rules may indicate certain combinations of verbs and nouns to identify functionalities (e.g., view portfolio, perform trade, manage account, etc.). These patterns may be identified based on annotations provided by the NLP/NLU techniques described above.

Functionality identifier 320 may alternatively employ a machine learning model to perform the classification. The functionality identifier may use annotated data and learn over time. Any conventional or other machine learning models may be employed (e.g., mathematical/statistical, classifiers, feed-forward, recurrent or other neural networks, etc.). For example, the functionality identifier may employ a neural network as described above. The neural network may be trained with sentences (or feature vectors of sentences) as input and corresponding known classifications (e.g., functionalities) as outputs. The feature vectors may include any features or characteristics of the sentences (e.g., word count, character count, frequency of terms, etc.). The output layer of the neural network indicates a classification for input data. By way of example, the output layer neurons may indicate a specific classification (e.g., corresponding to a functionality). Further, output layer neurons may be associated with different classes (or functionalities) and indicate a probability for the input data belonging to a class. The classes associated with the highest probabilities (e.g., based on exceeding or otherwise satisfying a threshold) are preferably selected as the classifications (e.g., functionalities) for the input. The machine learning model may be trained to identify functionalities (or words) that may be directly used as seeds for clustering. The sentences containing functionality are provided to the machine learning model. The machine learning model may receive the sentence text or feature vector, and produce one or more classifications indicating the functionalities for a corresponding sentence.

De-duplicate module 330 analyzes the identified functionalities and resolves duplicates based on synonyms or central domain knowledge. SEP detector 340 identifies services and service entry points (SEP) in the application code (e.g., a manner in which a client accesses a service, such as a calling program, etc.). The SEP detector may use any conventional or other static analysis tools to identify services exposed through configuration files or annotations in the code. In addition, the SEP detector may analyze runtime logs to detect service entry points (SEP).

For example, service entry points (SEP) may be detected in servlet code by searching for servlet classes and identifying service implementations reachable from the servlet classes. Service entry points (SEP) may be detected for Java API for RESTful Web Services (JAX-RS) by searching for classes and methods with JAX-RS annotations. With respect to Java Server Faces (JSF), service entry points (SEP) may be detected by extracting service expressions from view templates and finding classes and methods implementing the services. Service entry points (SEP) may be detected for SPRING by searching classes which have "Controller" and identifying service implementations reachable from the class, and also finding REST paths as service entry names. With respect to STRUTS, service entry points (SEP) may be detected by searching a configuration file (e.g., struts-config.xml) and identifying service implementation and name from an action tag. Service entry points (SEP) may be detected for Java API for XML Web Services (JAX-WS) by searching classes which have "Web Service" and identifying service implementations reachable from the class.

Mapper 350 maps functionalities from the user intent to software artifacts of the application identified by SEP detector 340, and may group the software artifacts for user confirmation with respect to a functionality. The mapper may use various information identified by program/data analysis module 222 (e.g., exposed services, service entry points (SEP), packages, names, comments, variables, database references in data definition language (DDL) or application code, plain old Java objects (POJO), interfaces, tables, labels, columns, module or program names, method names, summary, etc.) to perform the mapping. The mapping may use matching or partial matching of functionality to names or labels of the information identified by program/data analysis module 222 to identify one or more software artifacts (e.g., modules or programs) corresponding to the functionality. The mapping may be limited based on information in the user intent (e.g., limited to specified modules or services, etc.).

The mapping may result in software artifacts (e.g., modules or programs) of the application not being mapped to functionalities. For example, the matching or partial matching may not produce a mapping for a software artifact to the functionalities (e.g., based on names or features, etc.), but the software artifact may be related or connected to a software artifact that was mapped to a functionality. In this case, the software artifact is associated with the functionality by microservice recommender 230 during clustering (e.g., the unmapped software artifact is clustered with the mapped software artifact, etc.). By way of further example, the matching or partial matching may not produce a mapping for a software artifact to the functionalities due to attributes (e.g., names or features, etc.) significantly differing from the functionalities. In this case, the software artifact may indicate or be associated with a new functionality absent from the description of user intent. This may be determined based on the natural language processing (NLP) and/or natural language understanding techniques (NLU) described above (e.g., annotations and rules for determining functionality based on names or other attributes).

Mapper 350 may identify missing functionality relative to the description of user intent. In other words, there may be additional functionality in the application code (e.g., modules or programs) that may have not been mapped to functionality within the description of user intent as described above. When functionality is missing, mapper 350 may present and prompt a user to select missing functionality to include in the transformation. The user may further provide a label for the missing functionality.

In addition, mapper 350 may interact with a user to confirm mapping of software artifacts (e.g., modules or programs) to user intent. When user input is requested, mapper 350 may present mappings of the software artifacts to functionalities of the user intent, and enable the user to confirm or modify the mappings (e.g., add or remove software artifacts in a mapping, etc.).

The mapped software artifacts (e.g., modules or programs corresponding to the services or service entry points (SEP)) are provided from analysis module 220 to microservices recommender 230 to perform clustering. The mapped software artifacts may be filtered by mapper 350 based on information in the user intent (e.g., quantity of microservices, specified modules or services, etc.). The software artifacts (e.g., modules or programs) serve as a center or reference point for a corresponding cluster, and the clustering identifies or assigns remaining modules or programs of the application to the clusters based on closeness to those cluster centers. Each cluster corresponds to a microservice with the cluster members (or application modules or programs) indicating the functionality for that cluster. When an application module or program is assigned to two or more clusters, various metrics may be used to determine cluster membership (e.g., highest probability or confidence, etc.).

Intent analysis module 224 may alternatively employ a machine learning model to receive the description of user intent and determine the mapped software artifacts (e.g., modules or programs). Any conventional or other machine learning models may be employed (e.g., mathematical/statistical, classifiers, feed-forward, recurrent or other neural networks, etc.). For example, the intent analysis module may employ a neural network as described above. The neural network may be trained with various descriptions of user intent (or feature vectors of the user intent) as input and corresponding known classifications (e.g., corresponding to software artifacts of an application) as outputs. The feature vectors may include any features or characteristics of the description of user intent (e.g., word count, character count, frequency of terms, etc.). The output layer of the neural network indicates a classification for input data. By way of example, the output layer neurons may indicate a specific classification (e.g., corresponding to a group of software artifacts, etc.). Further, output layer neurons may be associated with different classes (or software artifacts) and indicate a probability for the input data belonging to a class. The classes associated with the highest probabilities (e.g., above or otherwise satisfying a threshold) are preferably selected as the classifications (e.g., software artifacts) mapped to the input. The description of user intent may be provided to the machine learning model. The machine learning model may receive the description or feature vector, and produces classifications indicating the software artifacts for a corresponding user intent.

Figure 4:
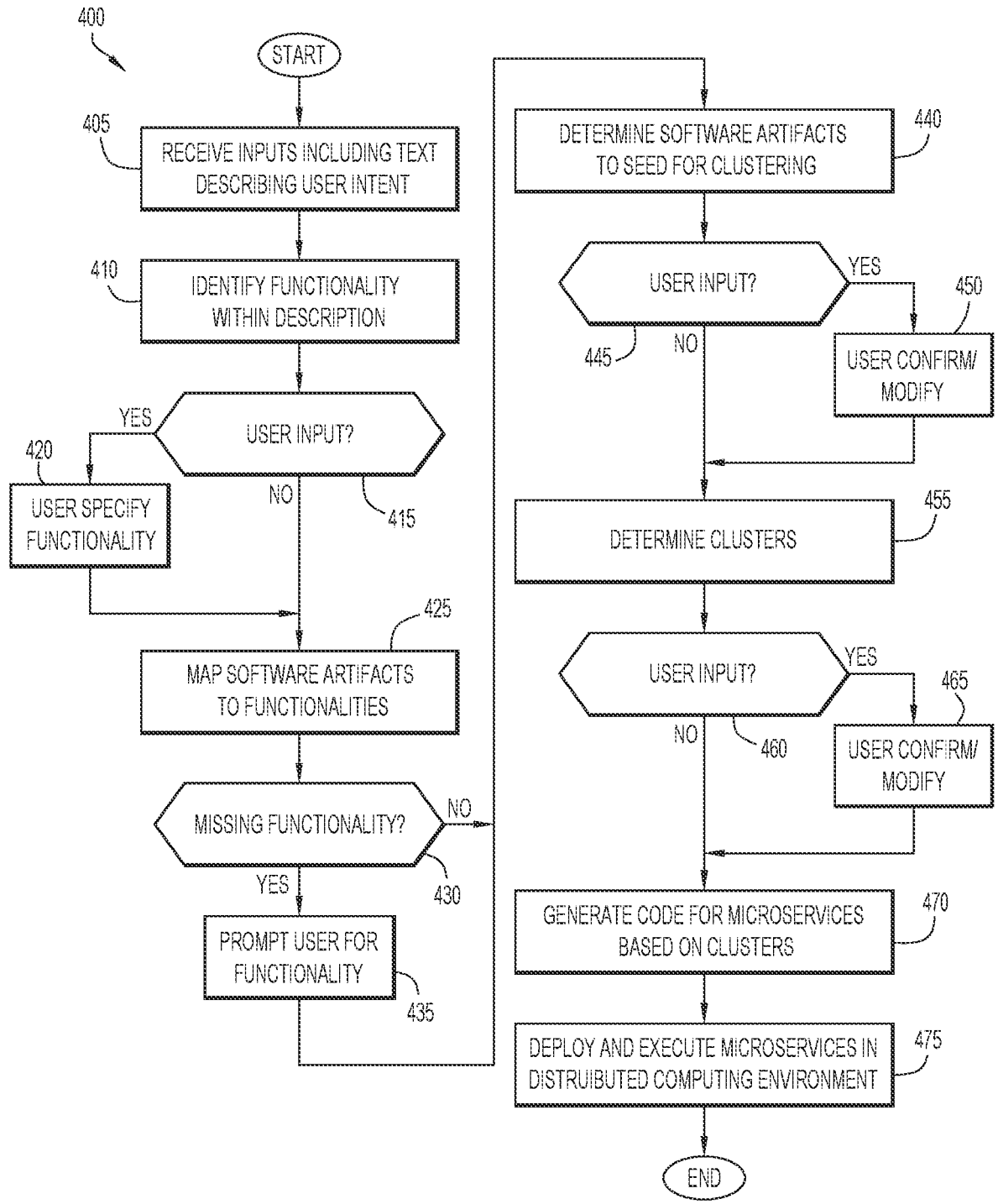
FIG. 4 is a procedural flowchart of a method of transforming an application to a microservice architecture based on user intent according to an embodiment of the present invention.

FIG. 4 is a procedural flowchart of a method 400 of transforming an application to a microservice architecture based on user intent according to an embodiment of the present invention. Initially, various inputs are received by transformation code 200 at operation 405 to produce microservices for an application. By way of example, the inputs may include code of an application to be transformed, various documents (e.g., readme or instruction documents, test documents, etc.), and/or a description of user intent for the transformation. The description is preferably in a natural language, and may include any form to provide a user intent or guidance for performing the transformation (e.g., keywords, text, a project description, a reference model, business or other language, etc.). The user intent may include any desired parameters or characteristics for producing the resulting microservices (e.g., functionality, specific software artifacts, quantity of resulting microservices and/or software artifacts for analysis, parameters, etc.).

Analysis module 220 identifies functionality within the description of user intent at operation 410. Intent analysis module 224 of the analysis module parses the description of user intent, and determines functionality within the sentences of the description in substantially the same manner described above. For example, the intent analysis module identifies sentences containing functionality, and analyzes those sentences to extract the functionality. This may be accomplished by employing natural language processing (NLP) and/or natural language understanding (NLU), rules, and/or machine learning in substantially the same manners described above.

When intent analysis module 224 does not identify certain (or any) functionalities within the description of user intent as determined at operation 415, the user may be prompted to enter or indicate the functionality at operation 420 (e.g., prompt the user to specify the functionality (e.g., as comma separated text, etc.), highlight text from the description pertaining to the functionality, etc.).

Intent analysis module 224 maps software artifacts (e.g., modules or programs, etc.) of the application to the determined functionalities at operation 425. Program/data analysis module 222 of analysis module 220 analyzes the code of the application to be transformed to provide various information (e.g., exposed services, service entry points (SEP), packages, names, comments, variables, database references in data definition language (DDL) or application code, plain old Java objects (POJO), interfaces, tables, labels, columns, module or program names, method names, summary, etc.). Mapper 350 of the intent analysis module may use the information from program/data analysis module 222 to perform the mapping in substantially the same manner described above. For example, the mapping may use matching or partial matching of functionality to names or labels of the information identified by program/data analysis module 222 to identify one or more software artifacts (e.g., modules or programs) of the application corresponding to the functionality.

Mapper 350 may identify missing functionality at operation 430. In other words, there may be additional functionality in the application code (e.g., modules) that may not have been mapped to functionality within the description of user intent. This may be performed in substantially the same manner described above. When functionality is missing, mapper 350 may present and prompt a user to select missing functionality to include in the transformation at operation 435. The user may further provide a label for the missing functionality.

Mapper 350 identifies one or more software artifacts (e.g., modules or programs) of the application at operation 440 to use as seed modules for clustering by microservice recommender 230. The mapped software artifacts may be provided as the seed modules, or the mapped software artifacts may be filtered based on the user intent. For example, the user intent may specify specific modules and/or a quantity of modules of the application to process. The seed modules basically indicate a center or reference point for a corresponding cluster.

Mapper 350 may interact with a user to confirm mapping of software artifacts (e.g., modules or programs) to user intent at operation 445. When user input is requested, mapper 350 may present mappings of the software artifacts to functionalities of the user intent at operation 450, and enable the user to confirm or modify the mappings (e.g., add or remove software artifacts in a mapping, etc.).

Microservice recommender 230 uses the seed modules to perform clustering and determine clusters at operation 455. The seed modules are used as a center or reference point for corresponding clusters, and the clustering produces clusters with members (or application modules or programs) having functionality similar or close to the seed module. In other words, the clusters each correspond to a microservice whose functionality is indicated by the members (or application modules or programs) belonging to that cluster. When an application module or program is assigned to two or more clusters, various metrics may be used to determine cluster membership (e.g., highest probability or confidence, etc.).

The clustering may be performed using any conventional or other clustering techniques (e.g., K-means clustering, hierarchical clustering, etc.). An unsupervised machine learning model may be employed to perform clustering based on the seed software artifacts (e.g., modules or programs), information determined for the application, and description of user intent. The software artifacts (e.g., modules or programs) of the application are clustered based on features of the information of the application and description of user intent. In other words, the clustered software artifacts (e.g., modules or programs) are similar in nature and functionality. The features may be used to form a feature vector for a corresponding software artifact (e.g., module or program). The feature vector includes one or more vector elements each including a value for a corresponding feature. The elements or dimensions of the feature vector define a feature space for the clustering. The features may include any desired features or characteristics of the software artifact (e.g., type, name, code features, entry points, etc.).

The software artifacts (e.g., modules or programs) are clustered by the unsupervised machine learning model based on features of the application information and description of user intent. The unsupervised machine learning model performs cluster analysis to group software artifacts of the application that have not been labeled, classified, or categorized. The cluster analysis identifies common characteristics. The unsupervised machine learning model preferably employs K-means clustering, however any conventional or other clustering techniques (e.g., hierarchical clustering, etc.) may be used to cluster the software artifacts.

The unsupervised machine learning model clusters the software artifacts (e.g., modules or programs) in the feature space to form clusters of software artifacts by processing the feature vectors of the software artifacts. The formed clusters are each associated with a corresponding microservice, and the functionality of members of the cluster indicate functionality for the corresponding microservice. The clustering may be performed to produce any quantity of clusters each associated with a microservice. The different software artifacts from mapper 350 form reference points for forming the clusters of the K-means or other clustering technique. The resulting clusters contain members having similar functionality to the reference software artifact.

The unsupervised machine learning model may be implemented by any conventional or other machine learning models (e.g., mathematical/statistical models, classifiers, feed-forward, recurrent or other neural networks, etc.). For example, neural networks may include an input layer, one or more intermediate layers (e.g., including any hidden layers), and an output layer. Each layer includes one or more neurons, where the input layer neurons receive input (e.g., feature vectors), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the unsupervised machine learning model may be trained with a training set of unlabeled features and/or new input features (e.g., application features, user intent features, etc.), where the neural network attempts to produce the provided data and uses an error from the output (e.g., difference between inputs and outputs) to adjust weight (and bias) values. The output layer of the neural network indicates a cluster for input data. By way of example, the output layer neurons may indicate a specific cluster or an identifier of the specific cluster. Further, output layer neurons may be associated with different clusters and indicate a probability (or confidence) of the input data belonging to the associated cluster. The cluster associated with the highest probability is preferably selected for the input data.

Microservice recommender 230 may interact with a user at operation 460. When user input is requested, the user may validate microservice recommendations, and/or perform iterative design by moving or re-arranging entities (e.g., microservices, functionalities, members within clusters, etc.) at operation 465.

Transformation code 200 may generate code stubs 250 (e.g., a code template or skeleton) for the microservices at operation 470. The code stubs preferably include some introductory code for the microservice (e.g., class or other headers or definitions, variable definitions, library access, etc.), and enable a user to enter code in the body to perform the functionalities. Alternatively, transformation code 200 may automatically generate the code for the microservices based on functionality or code of the software artifacts (e.g., modules or programs) belonging to the cluster. The generated microservices are deployed to a cloud or other distributed computing environment, and executed at operation 475. The microservices represent a transformed version of the application suitable for the cloud or other distributed computing environment.

Figure 5:
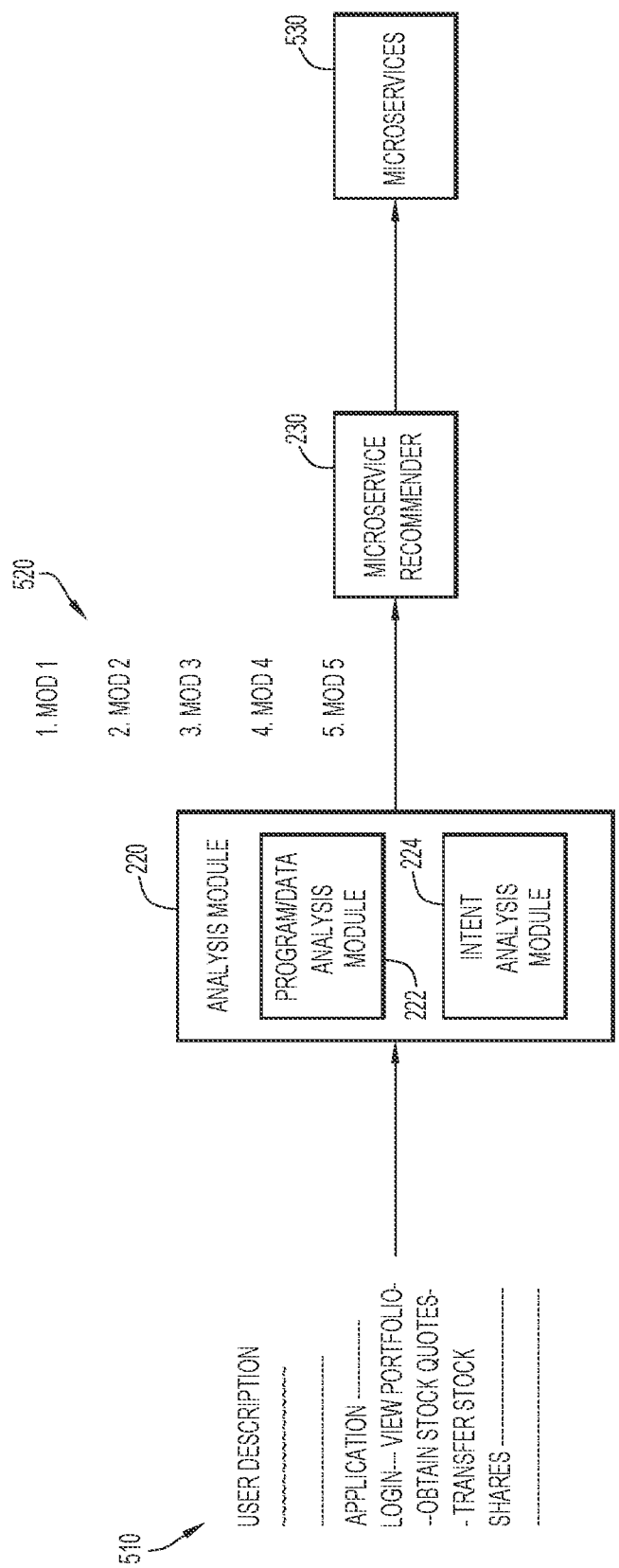
FIG. 5 is an illustration of an example scenario of transforming an application to a microservice architecture based on user intent according to an embodiment of the present invention.

FIG. 5 is an illustration of an example scenario of transforming an application to a microservice architecture based on user intent according to an embodiment of the present invention. Initially, various inputs may be provided to transformation code 200 to produce microservices for an application. By way of example, the inputs may include code of an application to be transformed, and a description of user intent 510 for the transformation. The inputs may further include various documents (e.g., readme or instruction documents, test documents, etc.). The description of user intent is preferably in a natural language, and may include any form to provide a user intent or guidance for performing the transformation (e.g., keywords, text, a project description, a reference model, business or other language, etc.). The user intent or guidance may include any desired parameters or characteristics for producing the resulting microservices (e.g., functionality, specific software artifacts, quantity of resulting microservices and/or software artifacts for analysis, parameters, etc.). In other words, the user intent indicates a manner the user desires for partitioning or mapping the application to microservices (e.g., specific quantity of microservices to produce, certain modules to consider or exclude, functionalities desired, etc.). In this example case, the description of user intent indicates functionalities of login, view portfolio, obtain stock quotes, and transfer stock shares.

Intent analysis module 224 of analysis module 220 identifies the functionalities within description of user intent 510 in substantially the same manner described above. In this case, the intent analysis module parses the description of user intent, and determines sentences containing application functionality. Intent analysis module 224 identifies at least four functionalities mentioned in the determined sentences (e.g., authentication (corresponding to "login"), portfolio management (corresponding to "view portfolio"), stock quote lookup (corresponding to "stock quotes"), and trade stocks (corresponding to "transfer stock shares"). The user may be prompted to specify functionalities when certain (or any) functionalities are not identified (e.g., specify the functionality, highlight text from the description or other input, etc.).

Program/data analysis module 222 of analysis module 220 analyzes the code of the application to be transformed to provide various information (e.g., exposed services, service entry points (SEP), packages, names, comments, variables, database references in data definition language (DDL) or application code, plain old Java objects (POJO), interfaces, tables, labels, columns, module or program names, method names, summary, etc.) as described above. Mapper 350 of the intent analysis module leverages application information from program/data analysis module 222, and maps software artifacts 520 (e.g., modules, MOD 1-MOD 4 as shown in FIG. 5) to the identified functionalities in substantially the same manner described above. Mapper 350 may identify additional functionality in the application beyond the functionality indicated in the description of user intent. In this case, the user is prompted to select from among the missing functionality for inclusion in the transformation in substantially the same manner described above. Mapper 350 may include the software artifact corresponding to a selected functionality (e.g., MOD 5 as viewed in FIG. 5).

Software artifacts 520 corresponding to the functionalities (e.g., MOD 1-MOD 5 as shown in FIG. 5) are provided to microservice recommender 230 to produce recommended or candidate microservices 530 in substantially the same manner described above. In this case, microservice recommender 230 partitions the application into five microservices (corresponding to the five functionalities) using the application information from program/data analysis module 222, and software artifacts 520 (e.g. modules. MOD 1-MOD 5 as viewed in FIG. 5) as anchors or centers for the clusters corresponding to the microservices.

Figure 6:
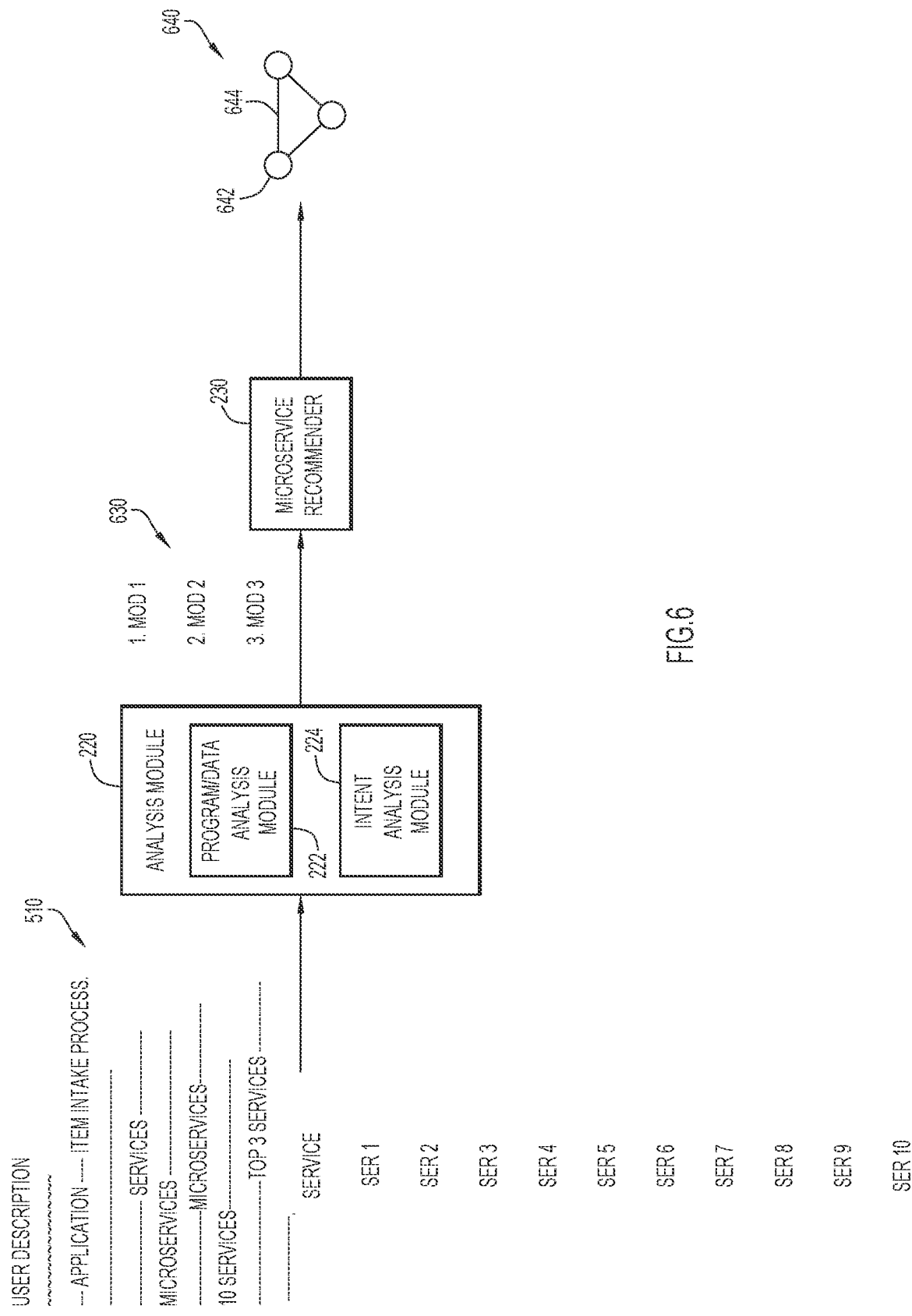
FIG. 6 is an illustration of another example scenario of transforming an application to a microservice architecture based on user intent according to an embodiment of the present invention.

FIG. 6 is an illustration of another example scenario of transforming an application to a microservice architecture based on user intent according to an embodiment of the present invention. Initially, various inputs may be provided to transformation code 200 to produce microservices for an application. By way of example, the inputs may include code of an application to be transformed, and a description of user intent 610 for the transformation. The inputs may further include various documents (e.g., readme or instruction documents, test documents, etc.). The description is preferably in a natural language, and may include any form to provide a user intent or guidance for performing the transformation (e.g., keywords, text, a project description, a reference model, business or other language, etc.). The user intent or guidance may include any desired parameters or characteristics for producing the resulting microservices (e.g., functionality, specific software artifacts, quantity of resulting microservices and/or software artifacts for analysis, parameters, etc.). In other words, the user intent indicates a manner the user desires for partitioning or mapping the application to microservices (e.g., specific quantity of microservices to produce, certain modules to consider or exclude, functionalities desired, etc.). In this example case, the description of user intent indicates functionality (e.g., item intake process), specific services (e.g., SER 1-SER 10 as viewed in FIG. 6), and a quantity of particular services on which to focus (e.g., initial three of the ten provided services).

Intent analysis module 224 of analysis module 220 identifies the functionalities and services within description of user intent 610 in substantially the same manner described above. In this case, the intent analysis module parses the description of user intent, and determines the functionality within sentences of the user intent and the particular services (e.g., SER 1-SER 3) to process.

Program/data analysis module 222 of analysis module 220 analyzes the code of the application to be transformed to provide various information including data pertaining to the specific modules (e.g., exposed services, service entry points (SEP), packages, names, comments, variables, database references in data definition language (DDL) or application code, plain old Java objects (POJO), interfaces, tables, labels, columns, module or program names, method names, summary, etc.) as described above. Mapper 350 of intent analysis module 224 leverages application information from program/data analysis module 222, and maps software artifacts 630 of the application to the particular services.

Software artifacts 630 pertaining to the particular services (e.g., modules MOD 1-MOD 3 as shown in FIG. 6) are provided to microservice recommender 230 to produce recommended or candidate microservices in substantially the same manner described above. In this case, microservice recommender 230 partitions the application into three microservices (e.g., corresponding to the particular services in the user intent) using the application information from program/data analysis module 222, and software artifacts 630 (e.g., modules MOD 1-MOD 3 as viewed in FIG. 6) as anchors or centers for clusters corresponding to the microservices. The microservices may be presented on a user interface. For example, the microservices may be presented in a form of a graph 640. The graph includes nodes 642 corresponding to the microservices, and edges 644 connecting nodes 642 to indicate relationships or connectivity between the microservices.

Figure 7:
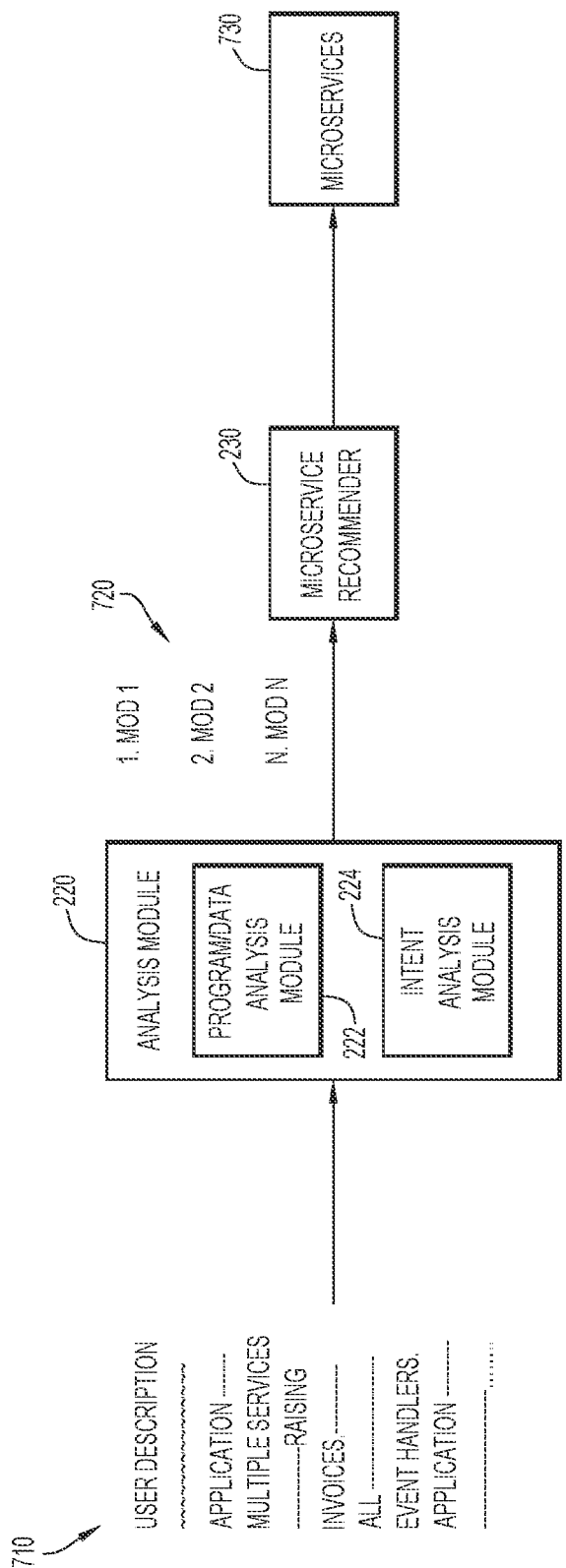
FIG. 7 is an illustration of yet another example scenario of transforming an application to a microservice architecture based on user intent according to an embodiment of the present invention.

FIG. 7 is an illustration of yet another example scenario of transforming an application to a microservice architecture based on user intent according to an embodiment of the present invention. Initially, various inputs may be provided to transformation code 200 to produce microservices for an application. By way of example, the inputs may include code of an application to be transformed, and a description of user intent 710 for the transformation. The inputs may further include various documents (e.g., readme or instruction documents, test documents, etc.). The description is preferably in a natural language, and may include any form to provide a user intent or guidance for performing the transformation (e.g., keywords, text, a project description, a reference model, business or other language, etc.). The user intent or guidance may include any desired parameters or characteristics for producing the resulting microservices (e.g., functionality, specific software artifacts, quantity of resulting microservices and/or software artifacts for analysis, parameters, etc.). In other words, the user intent indicates a manner the user desires for partitioning or mapping the application to microservices (e.g., specific quantity of microservices to produce, certain modules to consider or exclude, functionalities desired, etc.). In this example case, the description of user intent indicates functionalities related to invoices and event handlers.

Intent analysis module 224 of analysis module 220 identifies the functionalities within description of user intent 710 in substantially the same manner described above. In this case, the intent analysis module parses the description of user intent, and determines that the initial two sentences contain information related to the functionality (e.g., invoice services (e.g., corresponding to "raising invoices") and event handler services (e.g., corresponding to "event handlers")). The user may be prompted to specify functionalities when certain (or any) functionalities are not identified (e.g., specify the functionality, highlight text from the description or other input, etc.).

Program/data analysis module 222 of analysis module 220 analyzes the code of the application to be transformed to provide various information (e.g., exposed services, service entry points (SEP), packages, names, comments, variables, database references in data definition language (DDL) or application code, plain old Java objects (POJO), interfaces, tables, labels, columns, module or program names, method names, summary, etc.) as described above. Mapper 350 of the intent analysis module leverages application information from program/data analysis module 222, and maps software artifacts 720 (e.g., modules MOD 1-MOD N) as viewed in FIG. 7) to the functionalities in substantially the same manner described above. In other words, software artifacts 720 map to event handlers pertaining to invoices. Mapper 350 may identify additional functionality (e.g., service entry points (SEP), etc.) in the application beyond the functionality indicated in the description of user intent. In this case, the user is prompted to select from among the missing functionality for inclusion in the transformation in substantially the same manner described above. Mapper 350 may include the software artifact corresponding to a selected functionality.

Software artifacts 720 corresponding to the functionalities (e.g., MOD 1-MOD N as viewed in FIG. 7) are provided to microservice recommender 230 to produce recommended or candidate microservices 730 in substantially the same manner described above. In this case, microservice recommender 230 partitions the application into various microservices using the application information from program/data analysis module 222, and software artifacts 720 as anchors or centers for the clusters corresponding to the microservices.

Present invention embodiments provide various technical and other advantages. For example, present invention embodiments transform an application for a centralized architecture to a form for deployment and execution in a distributed architecture with reduced iterations, thereby conserving computing processing and resources. Further, code may be automatically generated for microservices to reduce errors, thereby conserving computing processing and resources (e.g., reduced compile times/attempts, less run time errors, etc.).

Further, the machine learning models may learn complex combinations of mappings and clustering, thereby increasing accuracy and reducing unnecessary processing with erroneous functionality. This reduces consumption of processing and memory/storage resources to improve computing performance.

In addition, the machine learning and other models may be continuously updated (or trained) based on feedback related to new user intent, selected functionalities, and/or selected software artifacts for mappings or clusters. For example, a missing functionality may be selected, and the system may learn (e.g., update NLP/NLU and/or machine learning models) to automatically include the selected functionality for future transformations based on a similar user intent.

Further, a software artifact may be initially mapped to a functionality with a lower confidence or probability. The software artifact may be mapped to another functionality by a user. This action may be used to update or train the machine learning model to increase the confidence for the software artifact for the new functionality (e.g., update or train the machine learning model to increase the probability of the software artifact for the new functionality, etc.).

Moreover, a software artifact may be assigned to a cluster with a lower confidence or probability. The software artifact may be moved to another cluster by a user. This action may be used to update or train the machine learning model to increase the confidence for the software artifact for the new cluster (e.g., update or train the machine learning model to increase the probability of the software artifact for the new cluster, etc.).

Thus, the machine learning models may continuously evolve (or be trained) to learn further functionalities, mappings, and/or clustering as the microservices are being produced.

It will be appreciated that the embodiments described above and illustrated in the drawings represent only a few of the many ways of implementing embodiments for transforming an application into a microservice architecture.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system. These systems may include any types of monitors and input devices (e.g., keyboard, mouse, voice recognition, etc.) to enter and/or view information.

It is to be understood that the software of the present invention embodiments (e.g., production code 200, analysis module 220, intent analysis module 224, microservice recommender 230, sentence classifier 310, functionality identifier 320, de-duplicate module 330, SEP detector 340, mapper 350, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., functionalities, mappings, clustering, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

A report may include any information arranged in any fashion, and may be configurable based on rules or other criteria to provide desired information to a user (e.g., microservices, software artifacts, etc.).

The present invention embodiments are not limited to the specific tasks or algorithms described above, but may be utilized for transforming or converting any application to any distributed computing environment.

The application may be of any type for conversion to a distributed computing environment (e.g., monolith application, etc.). For example, a present invention embodiment may be used to reconfigure or optimize a distributed application into different microservices. The transformation may be for any distributed computing environment (e.g., cloud, etc.). The application may be partitioned into any quantity of any software or other components of the distributed computing environment. Further, the microservices may be any software modules or other components of the distributed computing environment performing any portion of an overall process (e.g., any service or service portions, any portions or operations of an overall process to be performed, etc.). The software artifacts may include any item pertaining to software or code of the application (e.g., modules or programs of source and/or compiled code, documentation, data structures, data, test cases, transactions, endpoints, service entry points (SEP), etc.). A module may include any portion of the application code (e.g., programs, methods, routines, functions, data structures, data, etc.).

The user intent may include any form to provide a user intent or guidance for performing the transformation (e.g., keywords, text, a project description, a reference model, business or other language, readme or application description documents, etc.).

The program/data analysis module may obtain any information pertaining to the application code (e.g., exposed services, service entry points (SEP), packages, names, comments, variables, database references in data definition language (DDL) or application code, plain old Java objects (POJO), interfaces, tables, labels, columns, module or program names, method names, summary, etc.).

The intent analysis module may employ any conventional or other natural language processing (NLP) and/or natural language understanding (NLU) techniques to analyze the user intent and extract any desired information (e.g., entity extraction (e.g., identification of entities), relationship extraction (e.g., identification of relationships between entities, such as parent child, contains, is a, etc.), semantic analysis (e.g., meaning of terms, etc.), part-of-speech (POS) tagging or identification, etc.). The intent analysis module may employ any conventional or other machine learning models (e.g., mathematical/statistical, classifiers, feed-forward, recurrent or other neural networks, etc.) to extract the information and/or perform mapping. The mapping may utilize any type of matching or mapping (e.g., partial matching, probabilistic matching, machine learning, etc.) to map any quantity of software artifacts to any quantity of functionalities. Further, a machine learning model may be trained to identify functionalities (e.g., words, module or program names, etc.) in the user intent that may be directly used as seeds for the clustering. These functionalities may used alone or in combination with mapped software artifacts as seeds for clustering.

The microservice recommender may utilize any conventional or other clustering techniques (e.g., K-means clustering, hierarchical clustering, etc.), and may use any type of software artifact or functionality as a center or reference point for a cluster. The clustering may produce any quantity of clusters having any quantity of members or software artifacts. Software artifacts assigned to plural different clusters may be resolved in any fashion (e.g., highest probability or confidence, etc.). The microservice recommender may utilize any conventional or other machine learning models (e.g., mathematical/statistical models, classifiers, feed-forward, recurrent or other neural networks, etc.).

Code for the microservices may be generated in any fashion. For example, code stubs may be produced for a user to provide the code for functionality. Alternatively, the code (including the functionality) may be automatically generated in any fashion. For example, the code may be generated based on functionality or code of the software artifacts (e.g., modules or programs) belonging to a cluster (e.g., re-use of code, generation of new or equivalent code, etc.).

The microservices may be deployed to any quantity or combination of processing devices of any cloud or other distributed computing environment, and may be executed in any fashion (e.g., serial, parallel, etc.). The transformation of an application to distributed microservices enables faster processing time and conserves resources since multiple processing devices are performing the functionality (e.g., at least a portion of the processing is performed in parallel, etc.). The microservices may be deployed to the distributed computing environment for execution based on resource availability to provide improved processing time for functionality of the application.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of transforming an application for a distributed computing environment comprising:
    analyzing, via at least one processor, a description of user intent to extract information for transforming the application, wherein the extracted information indicates functionalities for the distributed computing environment;
    mapping, via the at least one processor, a plurality of software artifacts of the application to the functionalities, wherein the plurality of software artifacts form different groups of software artifacts;
    assigning, via the at least one processor, remaining software artifacts of the application into the different groups based on a remaining software artifact corresponding to a mapped software artifact of a group, wherein the different groups correspond to microservices for the distributed computing environment; and
    presenting, via the at least one processor, the microservices for the distributed computing environment based on the different groups.

2. The method of claim 1, wherein the application includes a monolith application and the plurality of software artifacts include modules of the monolith application.

3. The method of claim 1, wherein assigning remaining software artifacts comprises:
    clustering the remaining software artifacts of the application by a machine learning model based on the mapped software artifacts serving as reference points for clusters, wherein the clusters correspond to the different groups.

4. The method of claim 1, wherein mapping a plurality of software artifacts of the application comprises:
    determining that the application has additional functionalities relative to the description of user intent; and
    receiving user selection of one or more of the additional functionalities for transforming the application.

5. The method of claim 1, further comprising:
    generating, via the at least one processor, the microservices for the distributed computing environment based on functionality of the software artifacts within a corresponding group.

6. The method of claim 1, wherein the description of user intent includes natural language, and analyzing a description of user intent comprises:
    analyzing the description of user intent by natural language processing techniques and a machine learning model to extract the information for transforming the application.

7. The method of claim 1, wherein the extracted information further indicates a quantity of microservices, and a quantity of the different groups corresponds to the quantity of microservices.

8. A system for transforming an application for a distributed computing environment comprising:
    one or more memories; and
    at least one processor coupled to the one or more memories, wherein the at least one processor is configured to:
        analyze a description of user intent to extract information for transforming the application, wherein the extracted information indicates functionalities for the distributed computing environment;
        map a plurality of software artifacts of the application to the functionalities, wherein the plurality of software artifacts form different groups of software artifacts;
        assign remaining software artifacts of the application into the different groups based on a remaining software artifact corresponding to a mapped software artifact of a group, wherein the different groups correspond to microservices for the distributed computing environment; and
        present the microservices for the distributed computing environment based on the different groups.

9. The system of claim 8, wherein assigning remaining software artifacts comprises:
    clustering the remaining software artifacts of the application by a machine learning model based on the mapped software artifacts serving as reference points for clusters, wherein the clusters correspond to the different groups.

10. The system of claim 8, wherein mapping a plurality of software artifacts of the application comprises:
    determining that the application has additional functionalities relative to the description of user intent; and
    receiving user selection of one or more of the additional functionalities for transforming the application.

11. The system of claim 8, wherein the at least one processor is further configured to:
    generate the microservices for the distributed computing environment based on functionality of the software artifacts within a corresponding group.

12. The system of claim 8, wherein the description of user intent includes natural language, and analyzing a description of user intent comprises:
    analyzing the description of user intent by natural language processing techniques and a machine learning model to extract the information for transforming the application.

13. The system of claim 8, wherein the extracted information further indicates a quantity of microservices, and a quantity of the different groups corresponds to the quantity of microservices.

14. A computer program product for transforming an application for a distributed computing environment, the computer program product comprising one or more computer readable storage media having program instructions collectively stored on the one or more computer readable storage media, the program instructions are executable by at least one processor to cause the at least one processor to:
- analyze a description of user intent to extract information for transforming the application, wherein the extracted information indicates functionalities for the distributed computing environment;
- map a plurality of software artifacts of the application to the functionalities, wherein the plurality of software artifacts form different groups of software artifacts;
- assign remaining software artifacts of the application into the different groups based on a remaining software artifact corresponding to a mapped software artifact of a group, wherein the different groups correspond to microservices for the distributed computing environment; and
- present the microservices for the distributed computing environment based on the different groups.

15. The computer program product of claim 14, wherein the application includes a monolith application and the plurality of software artifacts include modules of the monolith application.

16. The computer program product of claim 14, wherein assigning remaining software artifacts comprises:
- clustering the remaining software artifacts of the application by a machine learning model based on the mapped software artifacts serving as reference points for clusters, wherein the clusters correspond to the different groups.

17. The computer program product of claim 14, wherein mapping a plurality of software artifacts of the application comprises:
- determining that the application has additional functionalities relative to the description of user intent; and
- receiving user selection of one or more of the additional functionalities for transforming the application.

18. The computer program product of claim 14, wherein the program instructions further cause the at least one processor to:
- generate the microservices for the distributed computing environment based on functionality of the software artifacts within a corresponding group.

19. The computer program product of claim 14, wherein the description of user intent includes natural language, and analyzing a description of user intent comprises:
- analyzing the description of user intent by natural language processing techniques and a machine learning model to extract the information for transforming the application.

20. The computer program product of claim 14, wherein the extracted information further indicates a quantity of microservices, and a quantity of the different groups corresponds to the quantity of microservices.

* * * * *